United States Patent

Meguro et al.

[15] 3,687,941
[45] Aug. 29, 1972

[54] 2-IMINOBENZODIAZEPINE DERIVATIVES

[72] Inventors: Kanji Meguro, Nishinomiya; Yutaka Kuwada, Ashiya, Hyogo; Toru Masuda, Nishinomiya, all of Japan

[73] Assignee: Takeda Chemical Industries, Ltd., Higashi-ku, Osaka, Japan

[22] Filed: July 8, 1969

[21] Appl. No.: 840,032

[30] Foreign Application Priority Data

July 12, 1968 Japan......................43/49236
July 12, 1968 Japan......................43/49237
July 8, 1968 Japan......................43/47661
June 21, 1969 Japan......................44/49178

[52] U.S. Cl...260/239 BD, 260/239.3 D, 260/465 E, 260/566 R, 424/244
[51] Int. Cl...C07c 119/14, C07c 121/66, C07d 53/06
[58] Field of Search..............................260/239 BD

[56] References Cited

UNITED STATES PATENTS 3,177,201  4/1965  Reeder et al. .............260/239

OTHER PUBLICATIONS

Houben–Weyl, " Methoden der Organischen Chemie," Vol. 11/2, (Stuttgart, 1958), pp. 39– 51. QD258H7.
Elderfield, " Heterocyclic Compounds," Vol. 9, (New York, 1967), pp. 337– 341. QD400E4.
Smith, " Open– Chain Nitrogen Compounds," Vol. 1, (New York, 1965), page 179. QD 412. N156.

*Primary Examiner*—Alton D. Rollins
*Attorney*—Wenderoth, Lind & Ponack

[57] ABSTRACT

Compounds of the formula

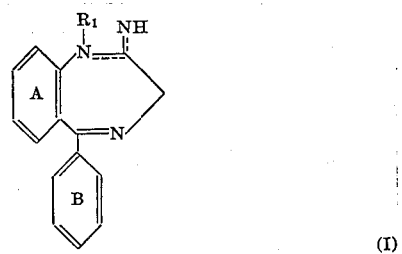

(I)

wherein $R_1$ is hydrogen or alkyl and the respective benzene rings A and B may have one or more substituents which are the same or different and selected from the group consisting of halogen, nitro, trifluoromethyl, alkyl and alkoxy are prepared by subjecting a compound of the formula

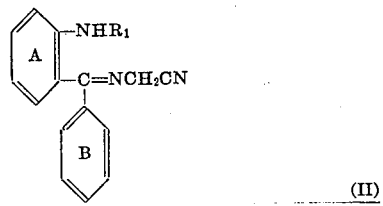

(II)

wherein $R_1$ has the same meaning as above and the respective benzene rings A and B may have one or more substituents as defined above to a ring closure reaction. Compounds of the formula II are produced by reacting a compound of the formula

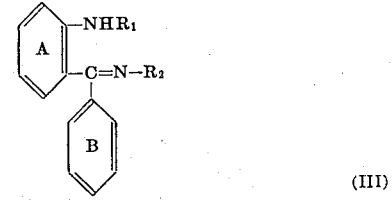

(III)

wherein $R_1$ has the same meaning as defined above and $R_2$ is hydrogen, alkyl, hydroxyalkyl or aralkyl with aminoacetonitrile. Compounds of the formula III are produced by reacting a compound of the formula

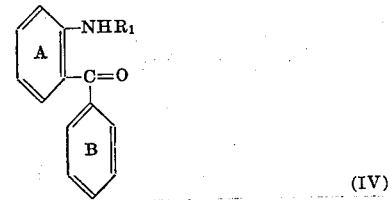

(IV)

with a compound of the formula $R_2NH_2$ wherein $R_2$ is hydrogen, alkyl, hydroxyalkyl or aralkyl.

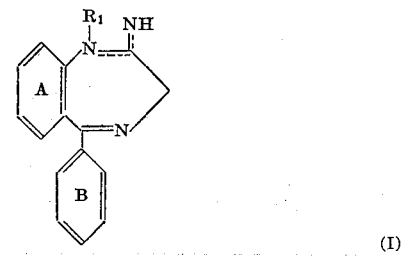

(I)

wherein $R_1$ has the meaning as defined above, and the respective benzene rings A and B may have one or more substituents as indicated above are useful as tranquilizing, muscle relaxant, anticonvulsant agents. Compounds of the formula

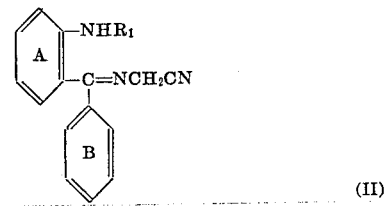

(II)

wherein $R_1$ is hydrogen, or alkyl and the respective benzene rings A and B may have one or more substituents which are the same or different and selected from the group consisting of halogen, nitro, trifluoromethyl, lower alkyl and lower alkoxy, are useful in the preparation of compounds II.

6 Claims, No Drawings

2-IMINOBENZODIAZEPINE DERIVATIVES

This invention relates to benzodiazepine derivatives of the general formula

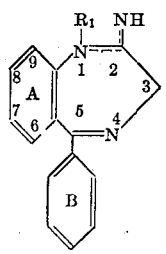

(I)

wherein $R_1$ is hydrogen or alkyl and the respective benzene rings A and B may have one or more substituents which are the same or different and are selected from the group consisting of halogen, nitro, trifluoromethyl, alkyl and alkoxy. The present invention also relates to a process for the production of the 2iminobenzodiazepine derivatives (I).

Regarding the above formula (I), when the symbol $R_1$ is an alkyl group, the compounds are represented by the general formula

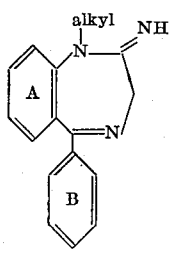

(I')

and, when the symbol $R_1$ is hydrogen atom, they are represented by the general formula

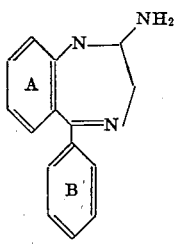

(I'')

The compound (I'') may form also an isomer of the formula

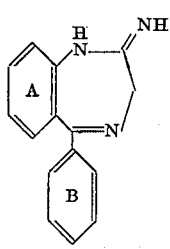

Hereinafter, the compounds of the formula (I) are simply referred to as "2-iminobenzodiazepine derivatives".

The 2-iminobenzodiazepine derivatives (I) wherein $R_1$ is hydrogen have been known as useful as tranquilizers. For the production of the benzodiazepine derivatives (I) wherein $R_1$ is hydrogen, the following method has been proposed:

1. allowing an aminobenzophenone derivative of the general formula

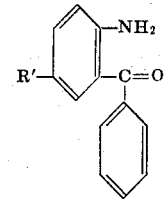

wherein R', for example, is hydrogen or chlorine, to react with hydroxylamine, whereby the corresponding aminobenzophenone oxime

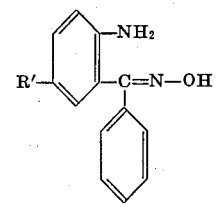

is produced, 2. reacting the resulting aminobezophenone oxime with chloroacetylchloride, whereby 2-chloromethyl-4-phenylquinazoline-3-oxide

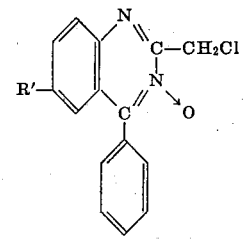

is yielded, 3. subjecting the resulting oxide to a ring expansion reaction with ammonia, whereby 2-amino-5-phenyl-3 H-1,4-benzodiazepine 4-oxide

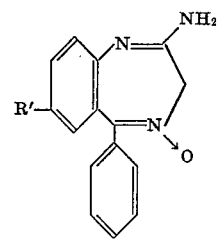

is yielded, and finally 4. treating the resulting oxide with deoxygenating agent, e.g. phosphorus trichloride, whereby 2-amino-5-phenyl-3H-1,4-benzodiazepine

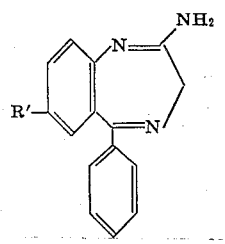

is given.

As seen from the above, the known method involves many complicated steps, and the yield of the final product is very low, e.g. around 20 percent overall. Thus, the known method is hardly practicable from an industrial point of view.

Moreover, the known method can be applied only for the production of 2-iminobenzodiazepine derivatives (I) wherein $R_1$ is H, and the 2-iminobenzodiazepine derivatives (I) wherein $R_1$ is other than hydrogen (e.g. alkyl) cannot be produced by the known method. In fact, the 1-alkyl-2-iminobenzodiazepine derivatives ($R_1$ of the formula (I) is alkyl) have never been produced, so far as the present inventors are aware. The present inventors have made extensive studies for finding out a process for producing 2-iminobenzodiazepine derivatives (I), which is industrially practicable and can be applied also for the production of 1alkyl-2-iminobenzodiazepine derivatives. The present invention is the culmination of the studies.

The principal object of the present invention is to provide an industrially practicable process for producing 2-iminobenzodiazepine derivatives (I).

Another object of the present invention is to provide novel and useful 1-alkyl-2-iminobenzodiazepine derivatives. Still another object of the present invention is to provide a method for the production of novel 1-alkyl-2-iminobenzodiazepine derivatives.

The process of the present invention comprises subjecting compounds of the general formula

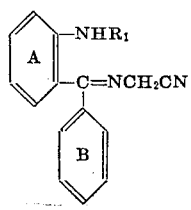

(II)

wherein $R_1$ has the same meaning as above and the respective benzene rings A and B may have one or more substituents as defined above to a ring closure reaction. The starting compounds of the formula (II) are novel compounds and can prepared by a method which comprises allowing compounds of the general formula

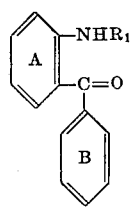

(III)

wherein $R_1$ has the same meaning as defined above and the respective benzene rings A and B may have one or more substituents as defined above to react with compounds of the general formula $R_2NH_2$ (IV) wherein $R_2$ is hydrogen, alkyl, hydroxyalkyl or aralkyl to produce a compound of the general formula

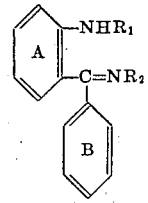

(V)

wherein $R_1$ and $R_2$ have the same meaning as defined above and the respective benzene rings A and B may have one or more substituents as defined above and allowing the resulting compounds (V) to react with aminoacetonitrile.

By using the method of the present invention, the object 2-iminobenzodiazepine derivatives of the formula (I) can easily be prepared in much higher yield, e.g. not lower than about 50 percent and in most cases more than 70 percent through a smaller number of steps than the known method starting from the same aminobenzophenone derivative as in the known method, ad therefore the present method is much advantageous from a viewpoint of industrial practicability.

Furthermore, according to the present method, it is possible to produce 1alkyl-2-iminobenzodiazepine derivatives, i.e. compounds of the formula (I) wherein $R_1$ is alkyl, which are novel compounds and have never been produced by known methods. The thus produced 1-alkyl-2-iminobenzodiazepine derivatives have much higher muscle-relaxant, anticonvulsant, taming and sedative effect than 2-iminobenzodiazepine derivatives i.e. compounds of the formula (I) wherein $R_1$ is hydrogen.

Referring to the afore-mentioned formulas, as the alkyl represented by $R_1$, lower alkyls and cycloalkyls having up to six carbon atoms are preferable. These may be exemplified by methyl, ethyl, propyl, isopropyl, butyl, sec-butyl, tert-butyl, amyl, hexyl, cyclopentyl, cyclohexyl, etc. Among the lower alkyls, methyl and ethyl groups are most desirable. The respective benzene rings A and B may have one or more substituents which are the same or different and are selected from the group consisting of halogen, nitro, trifluoromethyl, alkyl and alkoxy at optional position(s).

The halogen which may be attached to the benzene rings A and/or B is chlorine, bromine, iodine, and fluorine. The alkyl which may be attached to the benzene rings A and/or B is exemplified by lower alkyl, e.g. methyl, ethyl, propyl, isopropyl, butyl, sec-butyl, and the like. The alkoxy which may be attached to the benzene rings A and/or B is exemplified by lower alkoxy, for example, methoxy, ethoxy, propoxy, butoxy, and the like.

In the compounds of formulas (IV) and (V), which are used for the production of the starting materials (II) of the present method, the alkyl represented by $R_2$ may be straight, branched or cyclic ones which are exemplified by lower alkyls having one to six carbon atoms such as methyl, ethyl, propyl, isopropyl, butyl, sec-butyl, tert-butyl, hexyl, cyclohexyl, cyclopentyl, etc., the hydroxyalkyl represented by the $R_2$ is exemplified by lower hydroxyalkyls having two to four carbon atoms e.g. hydroxyethyl, hydroxypropyl, hydroxybutyl, etc. and the aralkyl represented by the $R_2$ is exemplified by benzyl, phenethyl, etc.

Hereinafter, the method of the present invention is described in detail including the steps of the production of the compounds (II), which are the starting materials of this method, from the compounds (III) through the compounds (V). The reaction between the aminobenzophenone derivatives (III) and the primary amines (IV) is conducted under heating in the presence or the absence of a solvent. The heating temperature is generally about 120° C. to about 130° C. An amount of the amines (IV) relative to the compounds (III) is generally not lower than 1 mole and preferably about 5 to about 10 moles per mole of the compounds (III). The compound (III) and/or the amine (IV) may be used in the form of their acid salts (e.g. hydrochloride, sulfate, etc.).

It is recommended that the reaction be carried out in the presence of, as a catalyst, 2-methylimidazole or its mineral acid salts (e.g. hydrochloride, sulfate, etc.).

The amount of the catalyst is generally not lower than one mole and preferably about 1 to about 5 moles per mole of the compounds (III).

Then, the compounds of the formula (V) produced in the above step are allowed to react with aminoacetonitrile, whereby α-phenylbenzylideneaminoacetonitrile derivatives (II) are produced almost quantitatively.

The reaction is generally carried out in the presence of anhydrous solvent. The preferable solvents are polar ones such as methanol, ethanol, pyridine, dimethylformamide, acetonitrile, etc.

The aminoacetonitrile is usually employed in the form of its acid salts, (e.g. hydrochloride, sulfate, hydrogen sulfate, etc.), and it is preferable to carry out the reaction in the presence of deacidifying agents such as triethylamine, pyridine, N-methylpiperidine, N-ethylpiperidine and 2-methylimidazole, etc.

The reaction is carried out generally near the boiling point of the solvent used, but, is required, may be carried out at higher or lower temperatures.

The amount of aminoacetonitrile employed is generally not lower than 1 mole, practically about 2 moles to 5 moles, per mole of the compounds (V).

The α-phenylbenzylidene aminoacetonitrile derivatives (II) thus produced are novel compounds and are used as the starting materials for the present method.

The α-phenylbenzylideneaminoacetonitrile derivatives (II) thus produced can be isolated in a conventional manner, for example, by distilling the solvent from the reaction mixture and extracting the residue with a suitable solvent and finally evaporating the solvent. But, the reaction mixture per se may be used as the starting substance for the present method.

The compound (II) and the compound (V) may form two isomers, one being syn-form and the other being anti-form, and therefore, those compounds may be obtained as a mixture of the two isomers. The mixture of two isomers may be separated into individual isomers after per se known manner, for instance, fractional crystallization of the mixture. However, in the method of the present invention and also in the production of the starting material for the present method, it is meaningless to separate these two isomers from the industrial view point, because each of the compounds (II) and (V) can be used in the next step, irrespective of its form. But, of course, any of the separated isomers, i.e. anti-form or syn-form may be used for the intermediate.

In the method of the present invention, the α-phenylbenzylideneaminoacetonitrile derivatives (II) are subjected to a ring-closure reaction. Generally the ring-closure reaction can easily proceed by keeping the compound (II) in a solvent in the presence of an acid or an alkali as a catalyst. The acid employable in the ring-closure reaction may be such inorganic acids, e.g. hydrochloric acid, sulfuric acid, phosphoric acid, etc., and organic acids, e.g. aliphatic carboxylic acid such as acetic acid, propioni acid, trifluoroacetic acid, and organic sulfonic acid such as benzene sulfonic acid, p-toluenesulfonic acid.

The alkali employable may be exemplified by alkali hydroxides such as sodium hydroxide and potassium hydroxide.

Among the acids and alkalis, the acids are more preferable. Among the acids, strong acids are preferable and the use is most desirably made of inorganic acid, especially hydrochloric acid. The amount of the acid employed is generally in excess, practically not lower than 2 moles, and preferably around 20 moles per mole of the α-phenylbenzylideneaminoacetonitriles (II).

The amount of the alkali employed is not lower than about 1 mole, and practically about 1 mole per mole of the α-phenylbenzylidenaminoacetonitriles (II).

The solvent usable is exemplified by an lower alcohol (e.g. methanol, ethanol, propanol, butanol, etc.) and aliphatic carboxylic acid (e.g. acetic acid, propionic acid, etc.).

The reaction temperature is about 0° C. to about 30° C., but, if required, may be at higher or lower temperatures.

The benzodiazepine derivatives (I) thus produced can be isolated in the form of free bases or suitable acid salts (e.g. hydrochloride, sulfate, acetate, etc.) by per se conventional means, for example, by distilling the solvent from the reaction mixture, extracting the residue with a suitable solvent and finally evaporating the solvent. For purposes of this invention the salts of the free bases are the full equivalents thereof.

Among the benzodiazepine derivatives (I), 1-alkyl-2-iminobenzodiazepine derivatives, i.e. the compounds (I) wherein $R_1$ is alkyl, are novel compounds and show much higher muscle-relaxant, anticonvulsant, sedative and taming effect than the known benzodiazepine derivatives, i.e. the compounds (I) wherein $R_1$ is hydrogen, and therefore they can be used as tranquillizing, muscle-relaxant and anticonvulsant agents, and the like, most advantageously. The benzodiazepine derivatives (I) as well as their acid salts are orally or parenterally administered per se or in a suitable form such as powder, granule, tablet or injection solution admixed with a pharmaceutically acceptable carrier or adjuvant. Dose of the benzodiazepine derivatives (I) to be administered varies with the respective compounds, but generally falls within a range of from about 1 to about 30 milligrams upon oral administration, and about 0.5 to about 10 milligrams upon parenteral administration for human adult per day.

Further, the benzodiazepine derivatives (I) produced by the present method may be converted into known benzodiazepin-2-one derivatives, which are also useful as tranquillizing, muscle relaxant, anticonvulsant and sleep inducing agents by alcoholysis or hydrolysis.

For further detailed explanation of the invention, the following examples are given, wherein the term "-part(s)" means "weight part(s)" unless otherwise noted, and the relationship between "part(s)" and "-part(s) by volume" corresponds to that between gram(s) and milliliter(s).

EXAMPLE - PARTS I-1

Production of the Starting Material

The step of

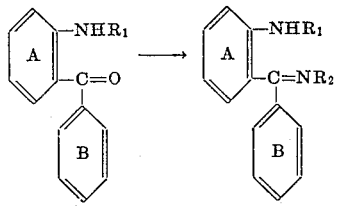

EXAMPLE 1

A mixture of 2.3 parts of 2-amino-5-chlorobenzophenone, 6.1 parts by volume of monoethanolamine and 1.2 parts of 2-methylimidazole hydrochloride is heated at 125° to 130° C. for 2 hours. After cooling, 200 parts of water is added to the resulting mixture, whereby 2-amino-5-chloro-α-phenyl-benzylideneaminoethanol is precipitated as pale yellow crystals. Melting point: 122° to 125° C. Yield: 2.6 parts (95 percent). Thus obtained crystals per se are employable as the starting material for the subsequent reaction without further purification.

For the purpose of more precise identification of the crystals, a small amount of the crystals is, after recrystallization from a mixture of benzene and hexane, subjected to determination of melting point and to elementary analysis, whereby the following result is obtained.

Melting point: 125°C to 126°C.
Elementary analysis:
Calculated for $C_{15}H_{15}ClN_2O$
C 65.57, H 5.50, N 10.20
Found: C 65.32, H 5.47, N 10.14

EXAMPLE 2

A mixture of 2.4 parts of 2-amino-5-nitrobenzophenone, 6.1 parts by volume of monoethanolamine and 1.2 parts of 2-methylimidazole hydrochloride is heated at 120° C. for 2 hours. After cooling, the resulting reaction mixture is added to 50 parts by volume of water, whereby 2-amino-5-nitro-α-phenyl-benzylideneaminoethanol is precipitated as crystals. Thus obtained crystals per se are employable as the starting material for the subsequent process without further purification. Yield: 2.7 parts (96 percent).

For the purpose of identification, a small amount of the crystals is, after subjected to determination of the melting point and to elementary analysis, recrystallized from benzene. Melting point: 151° to 152° C. (yellow needles).

Elementary analysis:
Calculated for $C_{15}H_{15}N_3O_3$
C: 63.15, H: 5.30, N: 14.73
Found C: 62.94, H: 5.08, N: 14.56

EXAMPLE 3

A mixture of 30 parts of 2-amino-5-chlorobenzophenone, 150 parts by volume of cyclohexylamine and 60 parts of 2-methylimidazole hydrochloride is heated at a temperature ranging from 130° to 140° C. for 9 hours. After cooling, the resulting mixture is added to 300 parts by volume of water, followed by extraction with ethyl acetate. From the ethyl acetate extract the solvent is distilled off, whereby 2-amino-5-chloro-α-phenylbenzylideneaminocyclohexane is obtained quantitatively. The product per se can be used as the starting material for the subsequent process without further purification.

For the purpose of identification, a small amount of the product is recrystallized from n-hexane to give 2-amino-5-chloro-α-phenylbenzylideneaminocyclohexane as colorless flakes melting at 136° to 138° C., which corresponds to one of the two isomers.

Elementary analysis:
Calculated for $C_{19}H_{21}ClN_2$
C: 72.94, H: 6.77, N: 8.96
Found C: 72.92, H: 6.60, N: 8.72.

EXAMPLE 4

A mixture of 2.4 parts of 2-amino-5-nitrobenzophenone, 12 parts by volume of cyclohexylamine and 3.6 parts of 2-methylimidazole hydrochloride is heated at 130° C. for 7 hours. After cooling, the resulting mixture is added to 50 parts by volume of water, whereby 2-amino-5-nitro-α-phenyl-benzylideneaminocyclohexane is precipitated as crystals. Yield: 3 parts (94 percent). Melting point: 131° to 137° C. Thus obtained crystals per se are employable as the starting material for the subsequent process without further purification. For the purpose of more precise identification, a small amount of the crystals is recrystallized from methanol to give yellow needles melting at 158° to 159° C., which corresponds to one of the two isomers.

Elementary analysis:
Calculated for $C_{19}H_{21}N_3O_2$
C: 70.56, H: 6.55, N: 13.00
Found C: 70.32, H: 6.58, N: 12.87

EXAMPLE 5

A mixture of 4.6 parts of 2-amino-5-chlorobenzophenone, 40 parts by volume of n-butylamine and 7.2 parts of 2-methylimidazole hydrochloride is heated in a sealed vessel at a temperature ranging from 130° to 140° C. for 4 hours. The butylamine is distilled off under reduced pressure. The resulting residue is partitioned between 200 parts by volume of water and 200 parts by volume of ethyl acetate. The ethyl acetate layer is washed with water and dried over sodium sulfate, followed by distillation of the solvent. This procedure gives 1-(2-amino-5-chloro-α-phenylbenzylideneamino) butane quantitatively as a yellow oily substance. Thus obtained oily substance per se is employable as the starting material for the subsequent process without further purification.

The oily substance is confirmed to be a mixture of anti and syn-forms by thin layer chromatography, infrared absorption spectrum and nuclear magnetic resonance spectrum.

EXAMPLE 6

A mixture of 4.8 parts of 2-amino-5-nitrobenzophenone, 40 parts by volume of n-butylamine and 7.2 parts of 2-methylimidazole hydrochloride is heated at 130° C. in a sealed vessel for 6 hours. The butylamine is distilled off under reduced pressure, followed by addition of 200 parts by volume of water. Thus separated oil is extracted with ethyl acetate, followed by distillation of the ethyl acetate, whereby 1-(2-amino-5-nitro-α-phenylbenzylideneamino)butane is obtained as a yellow oily substance. Yield: 5.9 parts (99 percent). Thus obtained oily substance per se is employable as the starting material for the subsequent process without further purification.

The oily substance is confirmed to be a mixture of syn and anti-forms by thin layer chromatography, infrared absorption spectrum and nuclear magnetic resonance spectrum.

EXAMPLE 7

A mixture of 10 parts of 2-methylamino-5-chlorobenzophenone, 25 parts of monoethanolamine and 4.8 parts of 2-methylimidazole hydrochloride is heated at 130° C. for 2 hours. After cooling, 100 parts of water is added to the resulting mixture. The aqueous mixture is extracted with ethyl acetate, followed by distillation of the solvent, whereby 2-methylamino-5-chloro-α-phenylbenzylideneaminoethanol is obtained. Yield: 11 parts (96 percent). Thus obtained product per se is employable as the starting material for the subsequent process without further purification.

For the purpose of identification, a small amount of the product is recrystallized from n-hexane to give yellow pillars melting at 98° to 99° C.

Elementary analysis:
    Calculated for $C_{16}H_{17}N_2OCl$
        C: 66.54, H: 5.93, N: 9.70
    Found C: 66.65, H: 5.82, N: 9.48

EXAMPLE 8

A mixture of 10 parts of 2-aminobenzophenone, 30 parts of monoethanolamine and 5.7 parts of 2-methylimidazole hydrochloride is heated at 160° C. for 1 hour. After cooling, 200 parts of water is added to the resulting reaction mixture, whereby 2-amino-α-phenylbenzylideneaminoethanol is precipitated as crystals. Yield: quantitative. Thus obtained crystals per se are employable for the subsequent process without further purification.

For the purpose of identification, a small amount of the crystals is recrystallized from a mixture of benzene and hexane to give colorless crystals melting at 110° C.

Elementary analysis:
    Calculated for $C_{15}H_{16}N_2O$
        C: 74.97, H: 6.71, N: 11.66
    Found: C: 75.00, H: 6.72, N: 11.39

The crystals are a mixture of a syn- and anti-forms and, when subjected repeatedly to a fractional crystallization, the mixture is separated into individual isomers, i.e. one being colorless needles melting at a temperature ranging from 118° to 119° C. and the other being colorless flakes melting at 116.5° C. Elementary analysis of each of the isomers coincides with the calculated value.

EXAMPLE 9

A mixture of 2.4 parts of 2-methylamino-5-chlorobenzophenone, 10 parts of cyclohexylamine and 4.8 parts of 2-methylimidazole hydrochloride is heated at 130° to 140° C. for 7 hours. After cooling, 100 parts of water is added to the resulting mixture, followed by extraction with ethyl acetate. The ethyl acetate is distilled off to give quantitatively 2-methylamino-5-chloro-α-phenylbenzylideneaminocyclohexane as an oily substance. Thus obtained oily substance per se is employable as the starting material for the subsequent process without further purification.

For the purposes of identification, a small amount of the oily substance is treated with ethanol to give crystals. The crystals are recrystallized from ethanol to give pale yellow needles melting at 126° to 127° C., which corresponds to one of the two isomers.

Elementary analysis:
    Calculated for $C_{20}H_{23}ClN_2$
        C: 73.49, H: 7.09, N: 8.57
    Found: C: 73.53, H: 7.20, N: 8.77

To the mother liquor obtained in the above recrystallization is added a small amount of water and the mixture is left standing, whereby the other isomer is given. The product is recrystallized from ethanol to give colorless granules melting at a temperature ranging from 101.5° to 102.5° C.

Elementary analysis:
    Calculated for $C_{20}H_{23}ClN_2$
        C: 73.49, H: 7.09, N: 8.57
    Found: C: 73.27, H: 7.15, N: 8.74

EXAMPLE 10

A mixture of 4.6 parts of 2-amino-5-chlorobenzophenone, 7 parts of n-propanolamine and 2.4 parts of 2-methylimidazole hydrochloride is heated at 180° C. for 30 minutes. To the resulting mixture is added 10 parts of water, followed by extraction with methylenechloride. The solvent is distilled off to give quantitatively 2-amino-5-chloro-α-phenylbenzylideneaminopropan-3-ol. Thus obtained product per se is employable as the starting material for the subsequent process without further purification.

For the purpose of identification, a small amount of the product is treated with n-hexane to give crystals melting at 102° to 105° C., which corresponds to one of the two isomers.

Elementary analysis:
    Calculated for $C_{15}H_{17}ClN_2O$
        C: 66.53, H: 5.93, N: 9.70
    Found: C: 66.52, H: 5.97, N: 9.65

EXAMPLE 11

To 100 parts of volume of methanol is added 10 parts of concentrated sulfuric acid, followed by addition of 16.4 parts of 2-methylimidazole. The mixture is concentrated under reduced pressure to give 2-methylimidazole sulfate. To the residue are added 42.3 parts of 2-amino-5-methylbenzophenone and 122 parts of monoethanolamine, followed by heating at 130° C. for 3.5 hours. After cooling, the mixture is poured into 1,000 parts of ice-water, followed by extraction with chloroform. The chloroform extract is dried over sodium sulfate, followed by distillation of the solvent. The residue is treated with petroleum ether to give 2-amino-5-methyl-α-phenylbenzylideneaminoethanol as pale yellow crystals. Yield: 40 parts (80 percent). Thus obtained crystals per se are employable as the starting material for the subsequent process without further purification.

For the purpose of identification, a small amount of the crystals is recrystallized from a mixture of benzene and n-hexane to give colorless prisms melting at 72° to 73° C.

Elementary analysis:
    Calculated for $C_{16}H_{18}N_2O$
        C: 75.66, H: 7.13, N: 11.02
    Found: C: 75.73, H: 7.08, N: 11.08

EXAMPLE 12

A homogeneous mixture of 9.1 parts 2-amino-5-methoxybenzophenone, 49 parts of monoethanolamine and 10.5 parts of 2-methylimidazole sulfate is heated at 130° C. for 2.5 hours. After cooling, the mixture is added to 500 parts of cold water, followed by extraction with ethyl ether. The ethyl ether extract is washed with water and dried over sodium sulfate, followed by distillation of the solvent under reduced pressure. This procedure gives quantitatively 2-amino-5-methoxy-α-phenylbenzylideneaminoethanol as an oily substance. Thus obtained oily substance per se is employable as the starting material for the subsequent process without further purification.

EXAMPLE 13

To 100 parts by volume of methanol is added 5.9 parts of concentrated sulfuric acid, followed by adding gradually 9.8 parts of 2-methylimidazole. The mixture is concentrated under reduced pressure to dryness. To the residue are added 15 parts of 2-amino-5-trifluoromethylbenzophenone and 10 parts by volume of monoethanolamine, and the mixture is heated at 130° C. for 2 hours. After cooling, the mixture is poured into 200 parts of cold water, followed by extraction with carbon tetrachloride. The carbon terachloride extract is washed thoroughly with water and dried over sodium sulfate, followed by distillation of the solvent. This procedure yields 2-amino-5-trifluoromethyl-α-phenylbenzylideneaminoethanol as a reddish yellow oily substance almost quantitatively. Thus obtained oily substance per se is employable as the starting material for the subsequent process without further purification.

EXAMPLE-PART I-2

Production of the Starting Material

The step of

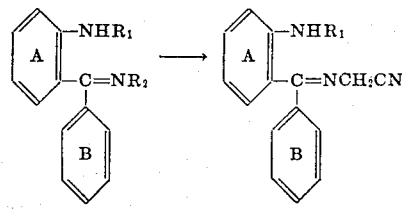

EXAMPLE 14

To a solution of 5.5 parts of the crystals prepared in Example 1 (2-amino-5-chloro-α-phenylbenzylideneaminoethanol) and 9.8 parts of 2-methylimidazole in 150 parts by volume of methanol, 9.2 parts of aminoacetonitrile hydrogen sulfate is added, and the mixture is refluxed for 1 hour, followed by distillation of the solvent. To the residue is added 100 parts by volume of water, and the mixture is extracted with ethyl acetate. The ethyl acetate layer is washed well with water and dried over sodium sulfate, followed by distillation of the solvent. The procedure gives 2-amino-5-chloro-α-phenylbenzylideneaminoacetonitrile as a yellow oily substance in quantitative yield. Thus obtained product per se is employable as the starting material for the subsequent process without further purification.

For the purpose of identification, a small amount of the product is recrystallized from isopropyl ether to give crystals. Recrystallization from isopropyl ether yields yellow prisms melting at 110° to 112° C., which correspond to one of the two isomers.

Elementary analysis:
    Calculated for $C_{15}H_{12}ClN_3$
        C: 66.79, H: 4.48, N: 15.58
    Found: C: 66.54, H: 4.50, N: 15.47

EXAMPLE 15

To a solution of 8.4 parts of the oil prepared in Example 7 (2-methylamino-5-chloro-α-phenylbenzylideneaminoethanol) and 14.7 parts of 2-methylimidazole in 150 parts by volume of ethanol, 13.8 parts of aminoacetonitrile hydrogen sulfate is added. The mixture is refluxed for 30 minutes, followed by distillation of the solvent. To the residue is added water and the aqueous mixture is extracted with ethyl acetate. The ethyl acetate layer is washed with water, and dried over sodium sulfate, followed by distillation of the solvent, whereby 8.2 parts of 2-methylamino-5-chloro-α-phenylbenzylideneaminoacetonitrile is obtained as a yellow oily substance. Yield 99 percent. Thus obtained oily substance per se is employable as the starting material for the subsequent process without further purification.

For the purpose of identification, a small amount of the product is crystallized from methanol to give yellow flakes melting at 127° to 128° C.

Elementary analysis:
    Calculated for $C_{16}H_{14}ClN_3$
        C: 67.72, H: 4.97, N: 14.81
    Found: C: 67.78, H: 4.91, N: 14.73

These flakes correspond to anti-form. When the mother liquor is concentrated and allowed to stand, colorless needles are obtained. Melting point: 103° to 104° C.

Elementary analysis:
Calculated for $C_{16}H_{14}ClN_3$
C: 67.72, H: 4.97, N: 14.81
Found: C: 67.72, H: 4.93, N: 14.88

These needles correspond to syn-form.

EXAMPLE 16

To a solution of 14.3 parts of the crystals prepared in Example 2 (2-amino-5-nitro-α-phenylbenzylideneaminoethanol) and 24.6 parts of 2-methylimidazole in 400 parts by volume of ethanol, 23.1 parts of aminoacetonitrile hydrogen sulfate is added. The mixture is refluxed for 1 hour, followed by distillation of the solvent. To the residue is added 500 parts by volume of water, and the mixture is subjected to extraction with ethyl acetate. The ethyl acetate layer is washed with water and dried over sodium sulfate, followed by distillation of the solvent, whereby 2-amino-5-nitro-α-phenylbenzylideneaminoacetonitrile is obtained as a red oily substance in quantitative yield. Thus obtained product per se is employable as the starting material for the subsequent process without further purification.

For the purpose of identification, a small amount of methanol is added to a small amount of the above oil, whereby yellow crystals are separated out. Recrystallization from ethanol yields yellow prisms. Melting point: 154° to 155° C.

Elementary analysis:
Calculated for $C_{15}H_{12}N_4O_2$
C: 64.27, H: 4.32, N: 19.99
Found: C: 64.56, H: 4.54, N: 19.95

These prisms correspond to one of the two isomers.

EXAMPLE 17

To a solution of 1.3 part of the oil prepared in Example 3 (2-amino-5-chloro-α-phenylbenzylideneaminocyclohexane) and 1.6 part of 2-methylimidazole in 40 parts by volume of methanol, 1.5 part of aminoacetonitrile hydrogen sulfate is added, and the resulting mixture is refluxed for 4.5 hours, followed by distillation of the solvent. Using ethyl acetate, the residue is treated in the same manner as Example 14, whereby 2-amino-5-chloro-α-phenylbenzylideneaminoacetonitrile is obtained as a yellow oily substance in quantitative yield. Thus obtained product per se is employable as the starting material for the subsequent process without further purification.

For the purpose of analysis, a small amount of the product is recrystallized from di-isopropyl ether in the same manner as Example 14 to yield yellow prisms of one of the isomers. The melting point and infrared absorption spectrum of this product are identical with those of the end product of Example 14.

EXAMPLE 18

In 10 parts by volume of methanol are dissolved 2.4 parts of 2-amino-5-nitrobenzophenonimine, 5 parts of 2-methylimidazole and 4.6 parts of aminoacetonitrile hydrogen sulfate. The mixture is refluxed for 1 hour, followed by distillation of the solvent. The residue is treated in the same manner as Example 16 to give 2-amino-5-nitro-α-phenylbenzylideneaminoacetonitrile as a red oily substance in quantitative yield. Thus obtained oily substance per se is employable as the starting material for the subsequent process without further purification.

For the purpose of identification, a small amount of the product is recrystallized from toluene to give yellowish-red crystals of one of the isomers. The melting point and infrared absorption spectrum of the product are identical with those of the end product of Example b16.

EXAMPLE 19

To a solution of 2.4 parts of the crystals prepared in Example 8 (2-amino-α-phenylbenzylideneaminoethanol) and 4.9 parts of 2-methylimidazole in 50 parts by volume of ethanol, 4.6 parts of aminoacetonitrile hydrogen sulfate is added. The mixture is refluxed for 30 minutes, followed by distillation of the solvent. To the residue is added water, followed by extraction with ethyl acetate. The ethyl acetate layer is washed with water and dried over sodium sulfate, followed by distillation of the solvent. The procedure gives 2-amino-α-phenylbenzylideneaminoacetonitrile as an oily substance in quantitative yield. Thus obtained product per se is employable as the starting material for the subsequent process without further purification.

EXAMPLE 20

In a solution of 68.5 parts of aminoacetonitrile hydrogen sulfate and 74 parts of 2-methylimidazole in 700 parts by volume of methanol is dissolved 38.2 parts of the crystals prepared in Example 11 (2-amino-5-methyl-α-phenylbenzylideneaminoethanol). The mixture is refluxed for 20 minutes and the methanol is distilled off under reduced pressure. To the residue is added water, followed by extraction with ethyl acetate. The ethyl acetate layer is washed well with water and dried over sodium sulfate, followed by distillation of the solvent under reduced pressure. The procedure yields 2-amino-5-methyl-α-phenylbenzylideneaminoacetonitrile as an oily substance quantitatively. The oil per se is employable as the starting material for the subsequent process without further purification.

EXAMPLE 21

To a solution of 20 parts of the oily substance prepared in Example 13 (2-amino-5-trifluoromethyl-α-phenylbenzylideneaminoethanol) in 350 parts of volume of methanol are added 28 parts of 2-methylimidazole and 26.3 parts of aminoacetonitrile hydrogen sulfate. The mixture is refluxed for 1 hour, followed by distillation of the methanol. To the residue is added water, followed by extractions with ethyl ether. The ethyl ether layer is washed with water, dried over sodium sulfate, followed by distillation of the ethyl ether. The procedure yields 2-amino-5-trifluoromethyl-α-phenylbenzylideneaminoacetonitrile as an oily substance almost quantitatively. Thus obtained oily substance per se is employable as the starting material for the subsequent process without further purification.

EXAMPLE 22

A solution of 1.35 parts of the oily substance prepared in Example 12 (2-amino-5-methoxy-α-phenylbenzylideneaminoethanol), 2.3 parts of aminoacetonitrile hydrogen sulfate and 2.46 parts of 2-methylimidazole in 10 parts by volume of methanol is refluxed for 20 minutes, followed by distillation of the solvent. To the residue is added 50 parts by volume of water and the mixture is extracted with chloroform. The chloroform extract is washed with water and dried over sodium sulfate, followed by distillation of the solvent. The procedure yields 2-amino-5-methoxy-α-phenylbenzylideneaminoacetonitrile as an oily substance quantitatively. Thus obtained oil per se is employable as the starting material for the subsequent process without further purification.

EXAMPLE-PART II

Production of the Object Material

The step of

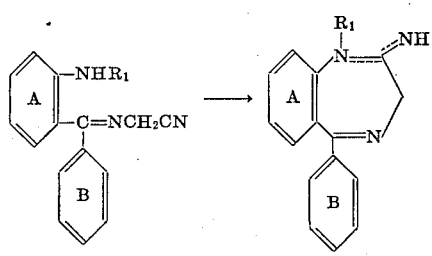

EXAMPLE 23

A solution of 2.7 parts of the oily substance prepared in Example 14 (2-amino-5-chloro-α-phenylbenzylideneaminoacetonitrile) in 20 parts by volume of methanol is saturated with dry hydrogen chloride gas under cooling with ice, and after 30 minutes, the resulting crystals are collected. The crystals are poured into 10 percent aqueous ammonia solution. The procedure yields 2-amino-7-chloro-5-phenyl-3H-1,4-benzodiazepine as white granules melting at 233° to 235° C. Yield: 71 percent.

Elementary analysis:
 Calculated for $C_{15}H_{12}ClN_3$
  C: 66.79, H: 4.48, N: 15.58
 Found: C: 66.77, H: 4.06, N: 15.53

EXAMPLE 24

To a solution of 270 parts of the oily substance prepared in Example 14 (2-amino-5-chloro-α-phenyl-benzylideneaminoacetonitrile) in 6 parts by volume of ethanol is added 1 part by volume of 1 N KOH solution in ethanol. The mixture is allowed to stand overnight at room temperature. The ethanol is distilled off at about 40° C. under reduced pressure. The residue is extracted with ethyl acetate, and the ethyl acetate extract is washed with water and dried over sodium sulfate. After the solvent is distilled off, the residue is recrystallized from methanol. The procedure gives 2-amino-7-chloro-5-phenyl-3H-1,4-benzodiazepine. Yield: 45 percent. The melting point and elementary analysis of this product are identical with those of the end product of Example 23.

EXAMPLE 25

A solution of 2.3 parts of the oily substance prepared in Example 19 (2-amino-α-phenylbenzylideneaminoacetonitrile) in 25 parts by volume of methanol is saturated with dry hydrogen chloride gas under cooling with ice, and the solution is allowed to stand for 1 hour. The solution is concentrated to a half of the initial volume under reduced pressure and at a temperature of 30° C. or below. The concentrate is poured into 15 percent aqueous ammonia solution and the resulting crystals are colled by filtration. The procedure gives 2-amino-5-phenyl-3H-1,4-benzodiazepine. Recrystallization from acetone gives colorless needles melting at 217° to 218° C. (decomposition). Yield; 70 percent.

Elementary analysis:
 Calculated for $C_{15}H_{13}N_3$
  C: 76.57, H: 5.57, N: 17.86
 Found: C: 76.47, H: 5.55, N: 17.79

EXAMPLE 26

A solution of 2.8 parts of the oily substance prepared in Example 16 (2-amino-5-nitro-α-phenylbenzylideneaminoacetonitrile) in 30 parts by volume of ethanol is saturated with dry hydrogen chloride gas under cooling with ice. After 1 hour, the resulting crystals are collected by filtration and washed with acetone. The procedure gives 2-amino-7-nitro-5-phenyl-3H-1,4-benzodiazepine dihydrochloride melting at 234° to 235° C. (decomposition). When the crystals are poured into 10 percent aqueous ammonia solution, crystals are free 2-amino-7-nitro-5-phenyl-3H-1,4-benzodiazepine are obtained. Recrystallization from tetrahydrofuran yields yellow granules melting at 227° to 228° C. (decomposition). Yield: 93 percent.

Elementary analysis:
 Calculated for $C_{15}H_{12}N_4O_2$
  C: 64.27, H: 4.32, N: 19.91
 Found: C: 64.48, H: 4.47, N: 19.77

EXAMPLE 27

1.4 Part of the oily substance prepared in Example 15 (2-methylamino-5-chloro-α-phenylbenzylideneaminoacetonitrile) is added to ethanol containing 10 percent dry hydrogen chloride gas under cooling, and the mixture is allowed to stand for 1.5 hour. The procedure gives 7-chloro-2-imino-1-methyl-5-phenyl-2,3-dihydro-1H-1,4-benzodiazepine dihydrochloride. Melting point: 198° to 200° C. (decomposition). Yield: 79 percent.

Elementary analysis:
 Calculated for $C_{16}H_{16}Cl_3N_3$
  $(C_{16}H_{14}ClN_3·2HCl)$
  C: 53.87, H: 4.52, N: 11.79
 Found: C: 53.92, H: 4.88, N: 11.27

EXAMPLE 28

37 Parts of the oily substance prepared in Example 20 (2-amino-5-methyl-α-phenylbenzylideneaminoacetonitrile) is dissolved in 200 parts by volume of methanol. The solution is saturated with dry hydrogen chloride gas under ice cooling, followed by being left standing for 1 hour. The solution is concentrated under reduced pressure to about one-third of the initial volume. The concentrate is poured into 700 parts of a concentrated aqueous ammonia solution. The resulting precipitates are collected by filtration, washed with water and dried over sodium sulfate. The procedure gives 2-amino-7-methyl-5-phenyl-3H-1,4-benzodiazepine as crystals, which are crystallized from ethanol to give 23.5 parts of pale yellow prisms melting at 222° to 223° C. (decomposition). Yield: 63 percent.

Elementary analysis:
    Calculated for $C_{16}H_{15}N_3$
        C: 77.08, H: 6.06, N: 16.86
    Found: C: 77.24, H: 6.08, N: 16.67

EXAMPLE 29

A solution of 16.6 parts of the oily substance prepared in Example 21 (2-amino-5-trifluoromethyl-α-phenylbenzylideneaminoacetonitrile) in 60 parts by volume of ethanol is saturated with dry hydrogen chloride gas under ice cooling, whereby 2-amino-5-phenyl-7-trifluoromethyl-3H-1,4-benzodiazepine dihydrochloride is precipitated. The precipitates are collected by filtration, washed with acetone and dried. The mother liquor is left standing for a while, whereby further crystals of the dihydrochloride are obtained. The above procedures give 13 parts in total of the dihydrochloride. Melting point: 215° to 223° C. (decomposition).

The dihydrochloride obtained above is poured into 10 percent aqueous ammonia solution with stirring. After 30 minutes, the precipitated crystals of 2-amino-5-phenyl-7-trifluoromethyl-3H-1,4-benzodiazepine are collected by filtration, washed with water and dried. The crystals are recrystallized from a mixture of acetone and n-hexane to give colorless flakes melting at 190° to 193° C. (brown at 180° C.). Yield: 9.7 parts (58 percent).

Elementary analysis:
    Calculated for $C_{16}H_{12}F_3N_3$
        C: 63.36, H: 3.99, N: 13.86
    Found: C: 63.25, H: 3.99, N: 13.79

EXAMPLE 30

A solution of 10 parts of the oily substance prepared in Example 22 (2-amino-5-methoxy-α-phenylbenzylideneaminoacetonitrile) in 50 parts of methanol is saturated with dry hydrogen chloride gas under ice cooling, followed by being left standing at the same temperature for 1 hour. The mixture is concentrated under reduced pressure to about one third of the initial volume and the concentrate is poured into an aqueous solution of ammonia followed by extraction with chloroform. The chloroform extract is washed with water and dried over sodium sulfate, followed by distillation of the chloroform under reduced pressure. The procedure yields 2-amino-7-methoxy-5-phenyl-3H-1,4-benzodiazepine as yellow crystals. The crystals are recrystallized from chloroform to give pale yellow needles melting at 184° to 185° C. Yield: 80 percent.

Elementary analysis:
    Calculated for $C_{16}H_{15}N_3O$
        C: 72.43, H: 5.70, N: 15.84
    Found: C: 72.47, H: 5.87, N: 15.69

What is claimed is:

1. A method for producing a compound of the formula:

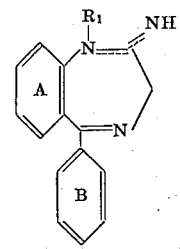

wherein $R_1$ is hydrogen, cycloalkyl having up to six carbon atoms or lower alkyl and the respective benzene rings A and B may have one or more substituents which are the same or different and selected from the group consisting of halogen, nitro, trifluoromethyl, lower alkyl and lower alkoxy which comprises subjecting a nitrile of the formula

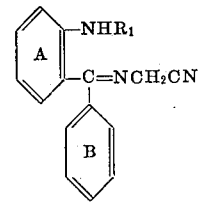

wherein $R_1$ has the same meaning as above and the respective benzene rings A and B may have one or more substituents as defined above to a ring closure in the presence of an acid or alkali.

2. The method as claimed in claim 1 wherein $R_1$ is alkyl.

3. A method according to claim 1 wherein the ring closure is conducted in the presence of an alkali metal hydroxide in an amount not lower than about 1 mole of alkali metal hydroxide per mole of nitrile in a solvent selected from the group consisting of methanol, ethanol, propanol, butanol, acetic acid and propionic acid.

4. A method according to claim 1, wherein the ring closure is conducted in the presence of an alkali metal hydroxide in an amount not lower than about 1 mole of alkali metal hydroxide per mole of nitrile in a solvent selected from the group consisting of methanol, ethanol, propanol, butanol, acetic acid and propionic acid.

5. A method according to claim 1, wherein the ring closure is conducted in the presence of a strong acid in an amount not lower than about 2 moles of acid per mole of nitrile in a solvent selected from the group consisting of methanol, ethanol, propanol, butanol, acetic acid and propionic acid.

6. A compound of the formula

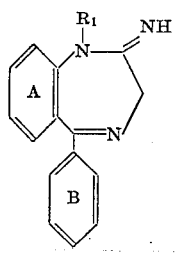
wherein $R_1$ represents alkyl and cycloalkyl of up to six carbon atoms and the respective benzene rings A and B may have one or more substituents which are the same or different and selected from the group consisting of halogen, nitro, trifluoromethyl, lower alkyl and lower alkoxy.
* * * * *